United States Patent [19]

Stephens et al.

[11] Patent Number: 4,482,406
[45] Date of Patent: Nov. 13, 1984

[54] PROPELLANT PLASTICIZER

[75] Inventors: William D. Stephens, Huntsville, Ala.; Erin G. Nieder, Manassas, Va.

[73] Assignee: The United States of America as represented by the Secretary of the Air Force, Washington, D.C.

[21] Appl. No.: 491,111

[22] Filed: May 3, 1983

[51] Int. Cl.$^3$ .............................................. C06B 45/10
[52] U.S. Cl. .................................. 149/19.4; 149/19.9; 149/20; 560/263
[58] Field of Search .................... 149/19.1, 19.9, 19.4, 149/20; 560/263

[56] References Cited

U.S. PATENT DOCUMENTS

| | | | |
|---|---|---|---|
| 3,948,697 | 4/1976 | Flanagan et al. | 149/19.8 |
| 4,017,429 | 4/1977 | Steele et al. | 260/2 EP |
| 4,090,893 | 5/1978 | Cucksee et al. | 149/19.9 |
| 4,110,135 | 8/1978 | Graham et al. | 149/19.9 |
| 4,148,967 | 4/1979 | Satoh et al. | 428/416 |
| 4,180,424 | 12/1979 | Reed et al. | 149/19.1 |
| 4,288,262 | 9/1981 | Flanagan et al. | 149/19.6 |
| 4,412,875 | 11/1983 | Hasegawa et al. | 149/19.9 |

*Primary Examiner*—Edward A. Miller
*Attorney, Agent, or Firm*—Donald J. Singer; Stanton E. Collier

[57] ABSTRACT

A plasticizer for propellant compositions is 2-hydroxy-3-butoxypropyl oleate. The plasticizer can be incorporated into propellants which conventionally include a binder fuel component, oxidizer component, isocyanate curing agent as well as other conventional components as desired such as bonding agents, curing catalysts and ballistic modifiers. Specifically, a preferred propellant having the internal plasticizer therein includes ammonium perchlorate oxidizer, HTPB binder, aluminum powder fuel, isophorone diisocyanate curing agent, a bonding agent and a delayed quick-cure catalyst. The migration of the plasticizer is substantially reduced so as to extend the shelf-life of rocket motors having the plasticized propellant therein.

3 Claims, No Drawings

PROPELLANT PLASTICIZER

STATEMENT OF GOVERNMENT INTEREST

The invention described herein may be manufactured and used by or for the Government for governmental purposes without the payment of any royalty thereon.

BACKGROUND OF THE INVENTION

The present invention generally relates to solid propellants, and, more particularly, to plasticizers used therein for purposes of improved processing, lower temperature flexibility and improved mechanical properties.

Plasticizers are used in rocket propellants for two general purposes which are processing assistance by incorporation of fluid materials in the propellant mix, and also the improvement of the low temperature flexibility and mechanical properties. There are some objections to the use of plasticizers in propellants which are associated with the tendency of plasticizer molecules to migrate or evaporate. Either of these processes results in chemical changes in composition which are bad for the propellant and for other inert parts of the rocket motor. On long term storage, for example, changes in mechanical properties of the propellant occur, particularly near the linear-rocket motor propellant bond. Secondary negative effects associated with the use of some plasticizers include crystallization at low temperatures, a tendency to soften the propellant excessively at high temperatures, and the migration of the plasticizer into the liner from uncured propellant much more rapidly than it does from a cured system. Consequently, it is desirable to have a plasticizer which does not migrate rapidly even from uncured propellant.

For a time, it was thought these problems could be circumvented by using larger plasticizer molecules which presumably would not migrate. One of the largest molecules used as a plasticizer in the rocket propellant industry is a material known as ZL-496. ZL-496 is a polybutadiene with a molecular weight of approximately 3,000. This material is used because the molecular size is quite large and it is believed that polymer chain entanglement would prevent migration. Experimentation with insulation taken from solid propellant motors, approximately five years old, indicated otherwise. One of the samples was taken from insulation in contact with the propellant, and the other was taken from the insulation that was separated from the propellant. After appropriate sample preparation technique, transmission FT-IR spectra was collected. These experiments definitely showed that even plasticizer molecules as large as ZL-496 do have some migration tendency which will ultimately act to shorten the shelf life of rocket motors.

The above observations show a need for internal plasticizers which will not migrate on aging or cause propellant to soften excessively at high temperatures.

SUMMARY OF THE INVENTION

The present invention is directed to a new internal plasticizer that provides improved processing properties, improved low temperature flexibility and improved mechanical properties by attaching itself to the propellant polymer network by strong, primary covalent bonds rather than weak associative or Van der Waals forces.

The new internal plasticizer compound of this invention has incorporated ester and ether groups and is unsaturated. The unsaturated compound, 2-hydroxy-3-butoxypropyl oleate, is prepared by combining oleic acid and butyl glycidyl ether in the presence of a catalyst solution composed of octanoic acid and chromium octoate. The resulting mixture is contained and heated for a given time which is determined by observing the disappearance of the epoxide linkage and the appearance of the ester linkage with a Fourier transform infrared spectrometer (FT-IR).

A composite solid propellant was prepared by mixing hydroxy-terminated polybutadiene liquid polymer binder; the plasticizer of this invention, 2-hydroxy-3-butoxypropyl oleate; bond promoter and acid scavengers; aluminum powder, ammonium perchlorate, isophorone diisocyanate and a cure catalyst.

The solid propellant produced from the above, has improved mechanical properties such as stress value and modulus as compared to a conventional propellant made with a conventional plasticizer such as dioctyl adipate (DOA).

One object of this invention is a new plasticizer capable of improving mechanical properties of solid propellants.

Another object of this invention is a new plasticizer that does not migrate from the solid propellant.

Another object of this invention is an improved solid propellant having the plasticizer of this invention therein.

A further object of this invention is an improved solid propellant with the plasticizer of this invention therein having improved properties such as stress and modulus.

These and many other objects and advantages of the present invention will be readily apparent to one skilled in the pertinent art from the following detailed description of the preferred embodiment of the invention.

DETAILED DESCRIPTION OF THE PREFERRED EMBODIMENTS

In arriving at the compound of this invention, it was determined through studies of related compounds that a compound having the following structures was most likely to provide the desired qualities of an internal plasticizer: unsaturated, branched, short-chained hydrocarbons. This plasticizer would attach to the polymer binder network by strong, primary covalent bonds rather than weaker bonds and thus be unable to migrate or evaporate away from the propellant.

The determination of a preferred molecular structure as noted above is based on a comparison of molecules having properties in three areas: saturated or unsaturated, branching, and chain length.

The results of tests done on materials of interest are given below:

1. Solubility was determined by measuring the absorption of plasticizers by unplasticized gumstock. The unsaturated, branched, short-chain structure was definitely one of the most soluble.

2. Thermal expansion, which was done to estimate changes in the volume percent of binder at high and low temperatures, was determined by placing 70% R-45M/30% plasticizer mixtures in graduated cylinders and conditioning them at the given temperatures. The unsaturated structures expanded slightly more at higher temperatures. This may be explained by coiling due to the double bond structure. The differences in high temperature expansion within the saturated and unsaturated classes were small; however, the smallest expansion occurred with branched chains. The differences in low temperature shrinkage were small with the exception of the saturated, branched, short-chain structure which froze at 0° F., leaving large voids in the sample.

3. Viscosity was measured using a Brookfield viscometer and a 20% mixture of the plasticizers in R-45M. The unsaturated structures generally showed better viscosity behavior at ambient and low temperatures than the saturated structures.

4. The low temperature tensile of uncured propellant at −65° F. was used as an assessment of polymer lubricity at low temperature. The unsaturated structures showed generally better strain than the saturated structures. The unsaturated, branched, short-chain structure showed an unusually high strain value at relatively low stress.

From these tests, it was concluded that the unsaturated, branched, short-chain structure exhibited excellent overall properties for use as an internal plasticizer.

To determine other desirable properties pour point depressants were also studied. Pour point depressants are used to decrease internal friction of hydrocarbon materials at low temperatures. This action prevents coalescence of microcrystalline regions. The pour point depressants studied were polyethers, ethers, and esters. Within these groups, the effects of various carbon-to-oxygen ratios were studied, since these ratios effect solubility and temperature relationships.

Solubility tests showed that polyethers were not sufficiently soluble in R-45M, a conventional binder fuel, to merit further evaluation. The results of the studies done on esters and ethers are described below.

1. The solubility of esters was tested by conditioning samples of R-45M containing various concentrations of the plasticizers at various temperatures. The results show esters of higher carbon-to-oxygen ratios tend to be more soluble in R-45M.

The solubility of ethers in R-45M was determined by measuring the absorption of plasticizer into unplasticized gumstock in the same manner as the hydrocarbons. The results of these tests also show increasing solubility with increasing carbon-to-oxygen ratio. All of these materials exhibited good solubility.

2. The coefficients of thermal expansion were tested using the same method described for the hydrocarbons. Better results were obtained at carbon-to-oxygen ratios of 3.6 to 5.5 for esters and 4.0 for ethers.

3. Viscosities were compared using a Brookfield viscometer. All of the ethers show viscosity behavior far better than any of the esters at all temperatures as shown in Table I.

4. The results of the gumstock tensile tests showed good low temperature strain, however, esters showed far better high temperature stress.

From these tests, it was concluded that ethers generally are better plasticizers than esters.

TABLE I
ETHERS GIVE LOWER VISCOSITY

| Sample | 145° F. | 65° F. | 0° F. | −30° F. | −60° F. | C/O |
|---|---|---|---|---|---|---|
| 100% R-45M | 1.006[1] | 8,850 | 98K | — | — | — |
| Esters | | | | | | |
| Di(methyl carbitol)[2] adipate | 451 | 4,750 | 65K | — | — | 2 |
| Dibutoxyethyl sebecate | 408 | 2,955 | 71K | — | — | 3.6 |
| Diisooctyl adipate | 460 | 3,245 | 47K | — | — | 5.5 |
| Diisononyl adipate | 453 | 3,775 | 78K | — | — | 6 |
| DOA | 425 | 2,905 | 20K | — | — | 5.5 |
| Ethers | | | | | | |
| Bis[2-(2-methoxyethoxy)ethyl] Ether | 138 | 400 | 4K | 58K | — | 2 |
| Dibutoxy tetraethylene glycol | 175 | 700 | 8K | 74K | — | 3.3 |
| Diethylene glycol, dibutyl Ether | 163 | 458 | 3K | 32K | 92K | 4 |

[1]Viscosities given in centipoise
[2]20% Plasticizer in R-45M

The plasticizer of the invention results from the following reaction:

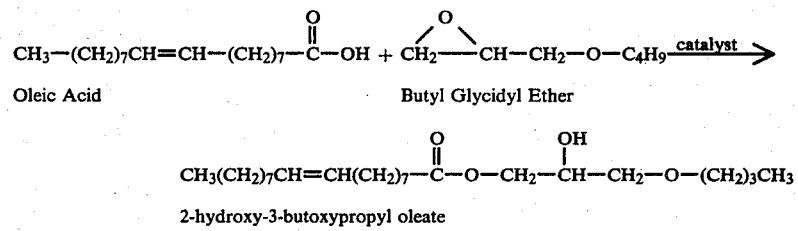

Oleic Acid + Butyl Glycidyl Ether → 2-hydroxy-3-butoxypropyl oleate

PROCEDURE 307.72 g (1.09 moles) of oleic acid (MW=282/mole) were combined with 142.42 g (#1.09 moles) of butyl glycidyl ether (MW=130 g/mole) in a 200 ml beaker and mixed with a stirring rod. A zero time FT-IR spectrum was obtained at this point. 2.24 g of 0.5% catalyst (95% octanoic acid and 5% chromium octoate solution) was stirred into the mixture which was then covered with a watch glass and then foil. The apparatus was placed in a 165° F. oven. The progress of the reaction was monitored by FT-IR by observing the disappearance of the epoxide linkage and the appearance of the ester linkage. Spectra were taken after 20.0 hours and 24.0 hours of reaction time. The absorbance of the product peak (wave number 1904) was ratioed against the CH peak (wave number 2851 to 2855.8). At the start of the reaction, the ratio of the CH peak to the product peak was 3.03. After 20 hours, that ratio was 1.376. After 24 hours, that ratio was 1.341. The reaction was complete at this time.

The acid number for the crude product was 0.152 eq. acid/100 g sample. The acid was removed by dissolving the product in methylene chloride in a 1:2 ratio. Small amounts of 0.01N NaOH were added and extracted. The product layer was drained and the water discarded and the extraction was repeated. The product was then washed twice with small amounts of water. The methylene chloride was then removed by rotary evaporation. The acid number of the internal plasticizer of this invention was 0.012 eq. acid/100 g sample.

The internal plasticizer contains one hydroxyl group for reaction with isocyanate curing agents and bonding into the binder polymer network.

The effect of the internal plasticizer (designated as IP in the tables) on the viscosity of R-45M is shown in Table II. The new plasticizer reduced the viscosity of R-45M at ambient and at elevated temperatures.

TABLE II

VISCOSITY OF PLASTICIZER (P) IN R-45M

| TEMP (0° F.) | R-45M | DOA[1] | IP |
|---|---|---|---|
| 128° F. | 293[2] | 146 | 158 |
| 74° F. | 1281 | 448 | 588 |
| 28° F. | 6520 | 1808 | 3010 |

[1] 2070 plasticizer used in R-45M (dioctyl adipate: DOA)
[2] All viscosities given in CPS.

The plasticizer was incorporated into a specific propellant as detailed in the following example. The internal plasticizer can be incorporated into other propellants, preferably those using an isocyanate curing agent.

EXAMPLE

The solid propellant having the internal plasticizer of this invention therein has the following compositions:

- 68.0% parts by weight of ammonium perchlorate oxidizer;
- 7.45% parts by weight of hydroxy-terminated polybutadiene binder (R-45M);
- 22.0% parts by weight of aluminum powder fuel;
- 0.25% parts by weight of a curing agent, isophorone diisocyanate (IPDI);
- 2.0% parts by weight of 2-hydroxy-3-butoxypropyl oleate which was prereacted with IPDI;
- 0.30% parts by weight of a bonding agent, HX-752; and
- 0.075% parts by weight of a delayed quick-cure catalyst (equal parts MgO, Triphenyl Bismuth, and Maleic Anhydride).

These ingredients were thoroughly mixed in a conventional mixer. After a homogenous mixture was been obtained, the uncured propellant was placed in an over at 170° F. for 7 days. At this time, a firm, rubbery solid propellant was obtained.

The physical properties of the above propellant are compared to a propellant using DOA as shown in Table III.

TABLE III

PHYSICAL PROPERTIES OF PLASTICIZED PROPELLANTS

−65° F. Test

TABLE III-continued

PHYSICAL PROPERTIES OF PLASTICIZED PROPELLANTS

| Plasti-cizer | Cure Ratio | Binder to Plasticizer Ratio | Temperature Strain | | |
|---|---|---|---|---|---|
| | | | Stress | Max*/Fail** | Modulus |
| DOA | 0.77 | 80:20 | 730 | 9/17 | 20,400 |
| IP | 0.77–1.25 | 92:8 | 890 | 3.3/3.3 | 37,100 |

| Ambient Test Temperature Strain | | | −165° F. Test Temperature Strain | | |
|---|---|---|---|---|---|
| Stress | Max*/Fail** | Modulus | Stress | Max*/Fail** | Modulus |
| 162 | 26/28 | 1310 | 133 | 25/26 | 1180 |
| 157 | 16/19 | 1800 | 96 | 16/16 | 893 |

*STRAIN AT MAX STRESS
**RUPTURE STRAIN

All fractions of the new propellant using the plasticizer of this invention were obtained using the Soxhlett extraction apparatus and are shown in Table IV.

TABLE IV

GEL FRACTIONS OF ANALOG PLASTICIZED PROPELLANTS

| PLASTICIZER | MIX NO. | GEL FRACTION | AMBIENT STRESS |
|---|---|---|---|
| None | 8823T | 0.413 | 103 |
| DOA | 8774T | 0.461 | 162 |
| IP | 214 | 0.639 | 190 |

Despite differences in stress levels, the new propellant made with the internal plasticizer of this invention compares favorably with the DOA propellant.

Clearly, many modifications and variations of the present invention are possible in light of the above teachings and it is therefore understood, that within the inventive scope of the inventive concept, the invention may be practiced otherwise than specifically claimed.

What is claimed is:

1. A solid propellant for use in a rocket motor comprising a mixture of:
   a fuel;
   an oxidizer for combusting said fuel;
   a binder for holding said fuel and said oxidizer comprising hydroxy-terminated polybutadiene;
   a nonmigrating plasticizer attaching to said binder and having the structural formula:

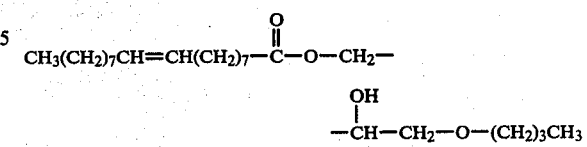

a bonding agent;
   a curing agent comprising a polyisocyanate; and
   a cure catalyst to react with said curing agent to solidify said mixture.

2. A solid propellant as defined in claim 1 wherein said mixture comprises about 22.0% parts by weight of aluminum powder fuel; about 68.0% parts by weight of ammonium percholorate oxidizer; about 7.45% parts by weight of hydroxy-terminated polybutadiene binder; about 2.0% parts by weight of 2-hydroxy-3-butoxpropyl oleate plasticizer; and a polyisocyanate curing agent.

3. A solid propellant as defined in claim 2 wherein said mixture includes 0.30% parts by weight of said bonding agent, about 0.25% parts by weight of isophorone diisocyanate curing agent, and about 0.075% parts by weight of equal parts of magnesium oxide, triphenyl bismuth, and maleic anhydride as a delayed quick cure catalyst.

* * * * *